(12) United States Patent
Toyomura et al.

(10) Patent No.: US 12,424,889 B2
(45) Date of Patent: Sep. 23, 2025

(54) ROTOR, MOTOR USING THE ROTOR, AND ELECTRONIC DEVICE

(71) Applicant: MINEBEA MITSUMI Inc., Nagano (JP)

(72) Inventors: Naoto Toyomura, Nagano (JP); Takuji Yamada, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 190 days.

(21) Appl. No.: 18/248,074

(22) PCT Filed: Oct. 15, 2021

(86) PCT No.: PCT/JP2021/038176
§ 371 (c)(1),
(2) Date: Apr. 6, 2023

(87) PCT Pub. No.: WO2022/085576
PCT Pub. Date: Apr. 28, 2022

(65) Prior Publication Data
US 2023/0378831 A1 Nov. 23, 2023

(30) Foreign Application Priority Data
Oct. 20, 2020 (JP) .................................. 2020-176289

(51) Int. Cl.
*H02K 1/27* (2022.01)
*H02K 1/276* (2022.01)
*H02K 21/16* (2006.01)

(52) U.S. Cl.
CPC ........... *H02K 1/2773* (2013.01); *H02K 21/16* (2013.01)

(58) Field of Classification Search
CPC .. H02K 1/2773; H02K 21/16; H02K 2213/03; H02K 1/2766; Y02T 10/64
See application file for complete search history.

(56) References Cited

U.S. PATENT DOCUMENTS

| 9,331,532 B2 | 5/2016 | Zhang et al. |
| 2013/0234555 A1 | 9/2013 | Takizawa et al. |

(Continued)

FOREIGN PATENT DOCUMENTS

| CN | 108768025 A | 8/2018 |
| CN | 109951037 A | 6/2019 |

(Continued)

OTHER PUBLICATIONS

International Search Report for corresponding International Application No. PCT/JP2021/038176 mailed Nov. 22, 2021.

(Continued)

*Primary Examiner* — Thomas Truong
(74) *Attorney, Agent, or Firm* — Chrisman Gallo Tochtrop LLC

(57) ABSTRACT

Provided is a rotor capable of effectively utilizing magnetic flux generated from a magnet, a motor using the rotor, and an electronic device. The rotor, the motor using the rotor, and the electronic device include a rotor core including: an annular part; a plurality of magnetic pole pieces extending in a radial direction; and a plurality of connecting parts configured to connect the annular part and each of the plurality of magnetic pole pieces; a plurality of first magnets disposed between two adjacent magnetic pole pieces of the plurality of magnetic pole pieces in a circumferential direction; and a plurality of second magnets disposed in a space formed between two adjacent connecting parts of the plurality of connecting parts in the circumferential direction, the connecting parts extending in a direction having both of a component of the radial direction and a component of the circumferential direction.

6 Claims, 4 Drawing Sheets

(56) References Cited

U.S. PATENT DOCUMENTS

| | | | |
|---|---|---|---|
| 2015/0108865 A1* | 4/2015 | Fujisawa | H02K 1/2773 |
| | | | 310/156.07 |
| 2015/0270753 A1 | 9/2015 | Ueda | |
| 2015/0318746 A1 | 11/2015 | Miyajima | |
| 2022/0037943 A1* | 2/2022 | Yamada | H02K 21/16 |
| 2022/0393532 A1 | 12/2022 | Zhang et al. | |

FOREIGN PATENT DOCUMENTS

| | | | |
|---|---|---|---|
| JP | 2013-187954 A | 9/2013 |
| JP | 2015-177721 A | 10/2015 |
| JP | 2015-211623 A | 11/2015 |
| JP | 2018-108028 A | 7/2018 |
| JP | 2020-124112 A | 8/2020 |

OTHER PUBLICATIONS

Written Opinion for corresponding International Application No. PCT/JP2021/038176 dated Nov. 22, 2021 and English translation.
Extended European Search Report dated Sep. 16, 2024 for corresponding European Application No. 21882717.8.
Office action dated Apr. 29, 2025 in the corresponding Taiwanese Application No. 110138650 and English translation.

* cited by examiner

ROTOR, MOTOR USING THE ROTOR, AND ELECTRONIC DEVICE

CROSS-REFERENCE TO RELATED APPLICATIONS

This application is a national stage entry of International Application No. PCT/JP2021/038176 filed on Oct. 15, 2021, which claims the benefit of priority to Japanese Application No. JP2020-176289, filed Oct. 20, 2020, the entire disclosures of which are hereby incorporated herein by reference.

TECHNICAL FIELD

The present invention relates to a rotor, a motor using the rotor, and an electronic device.

BACKGROUND ART

Conventionally, motors are used for a drive source in various devices. There are various types of motors, and each type of motor is selected in accordance with use purposes or situations. Among these motors, an interior permanent magnet (IPM) motor actively utilizing reluctance torque is highly efficient and can achieve high torque. The IPM motor is disclosed, for example, in Patent Literature 1 and Patent Literature 2.

However, in the technique described in Patent Literature 1, magnetic pole pieces arranged radially at a rotor core are in a state of being supported at an annular part of the rotor core center by a narrow connecting part between adjacent flux barriers. This makes it difficult to ensure the strength and may cause vibration or displacement due to force (centrifugal force or magnetic force) acting on the magnetic pole pieces at the time of driving the motor, thereby causing problems such as noise or rotor breakage.

In addition, with the technique described in Patent Literature 2, rigidity can be secured to some degree. However, the magnet extends long in the radial direction of the rotor, and thus in a region, of the magnetic pole face, away from the outer circumference of the rotor, the magnetic flux is less likely to be directed in the outer circumferential direction. As a result, the magnetic flux is not effectively utilized. For this reason, even if a large magnet is used to have a large magnetic pole face, efficiency equivalent to the size cannot be obtained, and it is necessary to secure a further large magnetic pole face. This prevents the motor from being downsized.

CITATION LIST

Patent Literature

Patent Literature 1: Japanese Patent Application Laid-open No. 2015-177721
Patent Literature 2: Japanese Patent Application Laid-open No. 2015-211623

SUMMARY OF INVENTION

Technical Problem

Thus, the present invention has been made in view of the background described above, and an object of the present invention is to provide a rotor making it possible to effectively utilize magnetic flux generated from a magnet, a motor using this rotor, and an electronic device.

Solution to Problem

The above problem is solved by the present invention described below. That is, a rotor according to the present invention includes: a rotor core including an annular part, a plurality of magnetic pole pieces extending in a radial direction, and a plurality of connecting parts configured to connect the annular part and each of the plurality of magnetic pole pieces;
a plurality of first magnets disposed between two adjacent magnetic pole pieces of the plurality of magnetic pole pieces in a circumferential direction; and
a plurality of second magnets disposed in a space formed between two adjacent connecting parts of the plurality of connecting parts in the circumferential direction, wherein
the connecting part extends in a direction having both components of a component of the radial direction and a component of the circumferential direction.

The rotor according to the present invention may be configured such that the first magnet is in contact with side surfaces of two adjacent magnetic pole pieces in the circumferential direction, and the second magnet is in contact with an inner surface of the magnetic pole piece in the radial direction.

In addition, the rotor according to the present invention may be configured such that
a magnetic pole of the first magnet at one side surface side and a magnetic pole of the first magnet at another side surface side, the magnetic pole pieces including the one side surface and the another side surface in the circumferential direction, and
a magnetic pole of the second magnet at an inner surface side of the magnetic pole piece in the radial direction have the same magnetic pole.

The rotor according to the present invention may be configured such that a portion of one end part of the second magnet in the circumferential direction opposes an end part of an inner surface side of the first magnet in the radial direction.

In addition, in the rotor according to the present invention, a portion of the space may be disposed between the one end part of the second magnet and an end part at the inner surface side of the first magnet.

Furthermore, a motor according to the present invention includes: the rotor according to the present invention described above;
a shaft fixed to the rotor; and
a stator including a coil and a magnetic body wound around with the coil.

In addition, an electronic device according to the present invention includes the motor according to the present invention.

DESCRIPTION OF EMBODIMENTS

Embodiments of the present invention will be described below with reference to the drawings.

Figure 1:
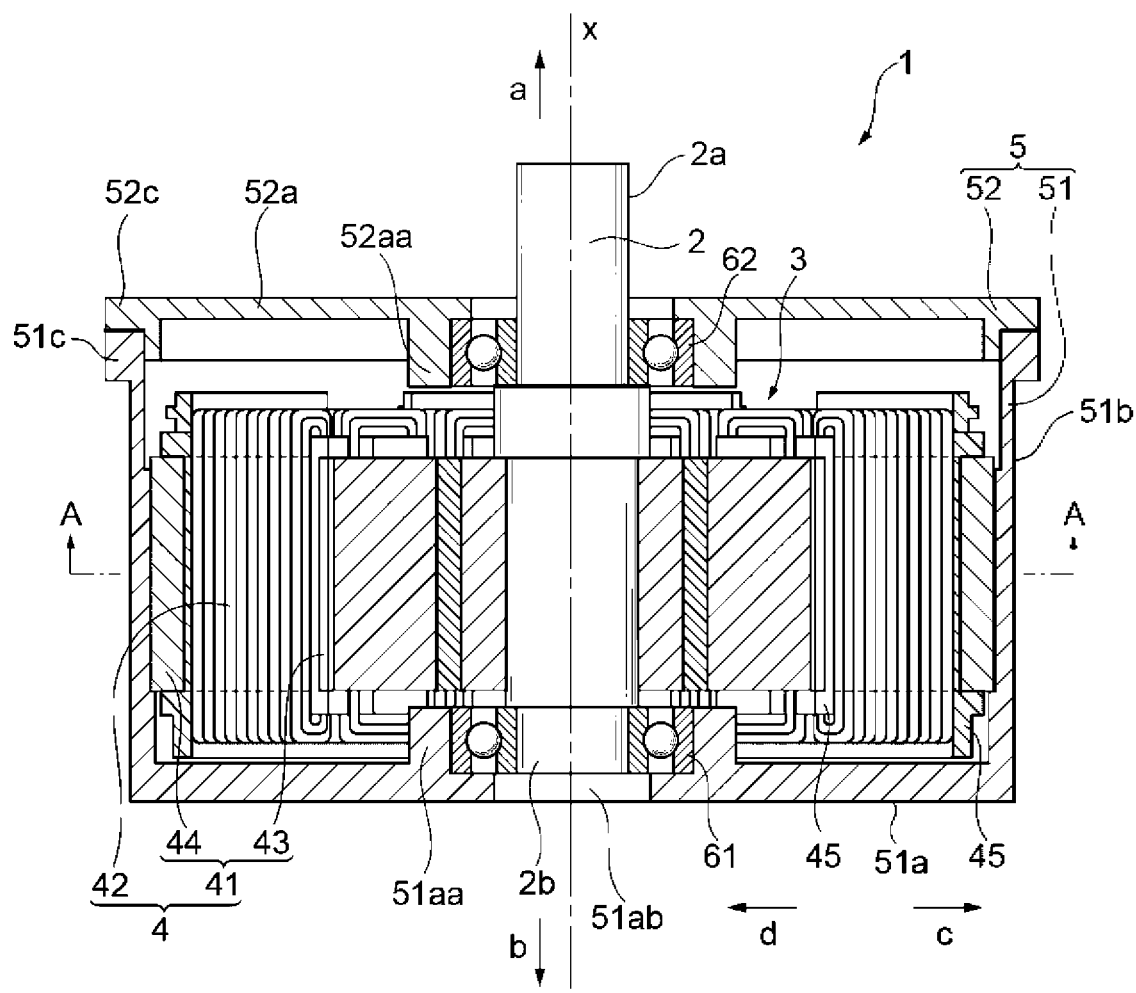
FIG. 1 is a vertical cross-sectional view illustrating a motor using a rotor according to an embodiment serving as one example of the present invention, and is a cross-sectional view taken along B-B in FIG. 2.
Figure 2:
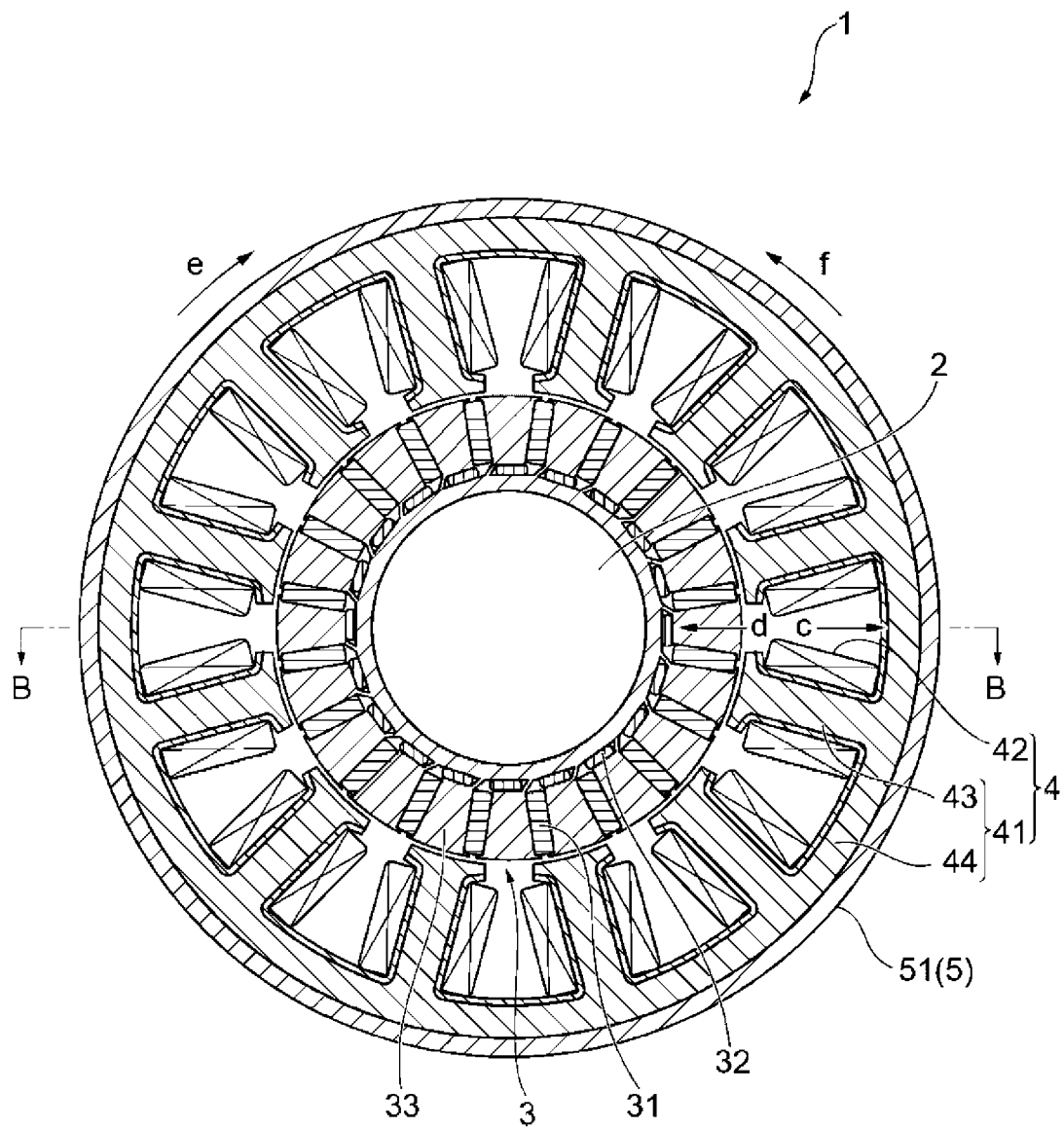
FIG. 2 is a horizontal cross-sectional view illustrating a motor using a rotor according to an embodiment serving as one example of the present invention, and is a cross-sectional view taken along A-A in FIG. 1.

FIG. 1 is a vertical cross-sectional view illustrating a motor 1 using a rotor 3 according to the embodiment serving as one example of the present invention. FIG. 2 is a horizontal cross-sectional view. FIG. 1 corresponds to the B-B cross-sectional view in FIG. 2. FIG. 2 corresponds to the A-A cross-sectional view in FIG. 1.

Note that in a description of the present embodiment, an "upper side" and a "lower side" refer to an up and down relationship in FIG. 1, and do not necessarily correspond to an up and down relationship in the gravitational direction.

Furthermore, in an axial line x direction (hereinafter also referred to as the "axial direction"), a direction of an arrow a is an upper side a, and a direction of an arrow b is a lower side b. Further, in a direction perpendicular to the axial line x (hereinafter also referred to as a "radial direction"), a direction moving away from the axial line x (a direction of an arrow c) is referred to as an outer circumferential side c, and a direction approaching the axial line x (a direction of an arrow d) is referred to as an inner circumferential side d. Then, the clockwise direction in a circumferential direction (a circumferential direction viewed from the upper side a) centered about a rotation axis x is referred to as a circumferential direction e, and the counterclockwise direction in the circumferential direction is referred to as a circumferential direction f.

The motor 1 according to the present embodiment is one type of inner-rotor type brushless motor, and is a spoke type IPM motor.

The IPM motor is configured such that a magnet is embedded in a rotor, and is also referred to as an embedded magnet type motor. There are various types of IPM motors, and a known spoke type IPM motor has a magnet having a rectangular cross section, and the longitudinal direction of the magnet is radially disposed in a rotor corer. In this spoke type motor, a surface at the longer side serves as a magnetic pole, and opposing magnetic pole faces of adjacent magnets in the circumferential direction have the same magnetic pole.

In this IPM motor, when a short circuit of magnetic flux occurs inside the rotor, the average magnetic flux density decreases, and this causes a reduction in efficiency. Thus, in a case of the spoke type IPM motor, a void is formed in the rotor core to form a flux barrier and direct the magnetic flux more to a stationary part as much as possible, thereby improving the efficiency of operation.

The motor 1 includes: a shaft 2 serving as a rotating shaft; a rotor 3 including magnets 31 and 32 disposed inside a rotor core 33 formed of a magnetic body, the rotor 3 being fixed to the shaft 2 and rotating together with the shaft 2; a stator 4 obtained by winding a coil 42 around a stator core 41 formed of a magnetic body, the stator 4 being disposed so as to surround the rotor 3; and a housing 5 fixed to the stator 4 and configured to accommodate, inside the housing 5, all or part of the constituent components of the motor 1.

The housing 5 accommodates all or part of the constituent components of the motor 1 such as the rotor 3 and the stator 4, and includes a housing body 51 fixed to the stator 4, and a cover 52 covering an opening provided at the upper part of the housing body 51. The housing body 51 includes a bottom part 51a including a protruding part 51aa, a tube part 51b, and an outer circumferential part 51c. The cover 52 includes an annular flat part 52a including a protruding part 52aa, and an outer circumferential part 52c. The protruding part 52aa of the cover 5 is provided at the flat part 52a, and protrudes in a direction (lower side b) toward the rotor 3 in the longitudinal direction (direction of the axial line x) of the shaft 2. The outer circumferential part 51c of the housing body 51 and the outer circumferential part 52c of the cover 52 are fixed (fastened) to shield the inside of the housing 5 from the outside, and the motor 1 is completed.

The motor 1 is provided with a plurality (two in the present embodiment) of bearings 61 and 62 rotatably supporting the shaft 2 relative to the housing 5. One bearing 61 of the plurality of bearings 61 and 62 is provided at the bottom part 51a of the housing body 51. The protruding part (hereinafter, referred to as a "bearing housing") 51aa and a hole part Slab are provided at the bottom part 51a of the housing body 51 supporting the bearing 61. The protruding part 51aa protrudes in a direction (upper side a) toward the rotor 3 in the longitudinal direction (direction of the axial line x) of the shaft 2. The bearing 61 is fixed to this bearing housing 51aa through press fitting or the like. The other bearing 62 is fixed to the protruding part (hereinafter, referred to as a "bearing housing") 52aa of the cover 52 through press fitting or the like. In the radial direction, the outer diameter and the inner diameter of the bearing 61 and the outer diameter and the inner diameter of the bearing 62 are substantially equal.

Note that, although the outer diameter and the inner diameter of the one bearing 61 and the outer diameter and the inner diameter of the other bearing 62 are substantially equal to each other, the outer diameter or the inner diameter of or both of these diameters of the other bearing 62 may be larger than the outer diameter or the inner diameter of or both of these diameters of the one bearing 61. Further, the hole part 51ab may not be provided at the bottom part 51a.

The shaft 2 includes two end parts 2a, 2b. One end part 2b at the housing body 51 side is rotatably supported relative to the housing body 51 by the one bearing 61, and the other end part 2a at the cover 52 side is rotatably supported by the other bearing 62. Thus, the shaft 2 is rotatably fixed to the housing body 51 via the bearing 61 and the cover 52 via the bearing 62, and the one end part 2a of the shaft 2 protrudes from the cover 52. Rotating force can be extracted from the one end part 2a of the shaft 2 to the outside. The shaft 2 is fixed to the rotor 3, and as the rotor 3 rotates due to electromagnetic effect between the stator 4 and the rotor 3, the shaft 2 rotates together with the rotor 3.

The stator 4 includes the stator core 41 including a teeth part 43, and the coil 42.

The stator core 41 is a stacked body of a magnetic body such as silicon steel sheet or the like, and includes an annular part (hereinafter, referred to as a "circular ring part") 44 disposed coaxially with the shaft 2, and a plurality of magnetic pole parts (hereinafter, referred to as a "teeth part") 43 formed so as to extend toward the shaft 2 side from the circular ring part 44.

The coil 42 is wound around each of the plurality of teeth parts 43. The stator core 41 and the coil 42 are isolated from each other by an insulator 45 made of an insulation material.

Figure 3:
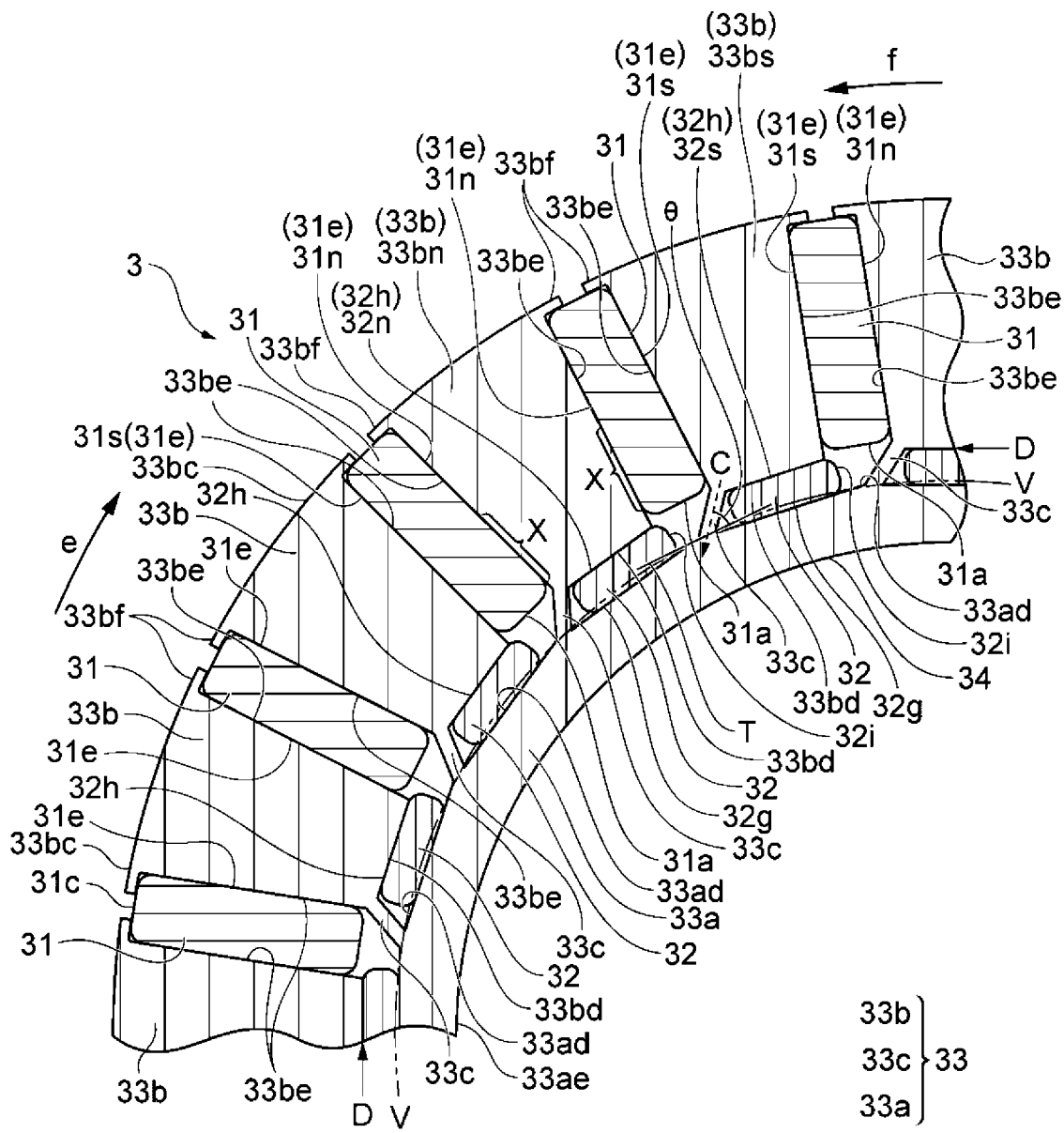
FIG. 3 is a partial cross-sectional view illustrating a rotor according to an embodiment serving as one example of the present invention.

Next, the rotor 3 according to the present embodiment will be described in detail. FIG. 3 illustrates a partial cross-sectional view of the rotor 3 according to the present embodiment.

The rotor core 33 serving as one of the constituent components of the rotor 3 is formed of a stacked body including a plurality of magnetic bodies, and includes a hole part 34. The shaft 2 is inserted into the hole part 34. The rotor core 33 includes: an annular part 33a including the hole part 34 provided at the center part; a plurality (20 pieces in the present embodiment) of magnetic pole pieces 33b formed radially in the radial direction toward the stator 4 with the base point D being a position spaced apart from an outer surface 33ad of the annular part 33a; and a connecting part 33c connecting the end part, at the base point D side of each of the plurality of magnetic pole pieces 33b and the outer surface 33ad of the annular part 33a. The plurality of magnetic pole pieces 33b extend radially in the radial direction from the annular part 33a through the connecting part 33c toward the outer side c (stator 4). Note that the annular part 33a includes the outer surface 33ad, and an inner surface 33ae forming the hole part 34.

Each of the plurality of magnetic pole pieces 33b includes: an outer surface 33bc; an inner surface 33bd disposed at the annular part 33a side; two side surfaces 33be opposed to the side surface 31e of a first magnet 31 (to be described later) in the circumferential direction ef; and a plurality of protruding parts 33bf. The protruding parts 33bf protrude in the circumferential direction ef toward adjacent another magnetic pole piece 33b. Of two adjacent magnetic pole pieces 33b in the circumferential direction ef, the protruding part 33bf of one magnetic pole piece 33b and the protruding part 33bf of the other magnetic pole piece 33b are opposed to each other, and are spaced apart from each other so as to form a predetermined gap.

A plurality of first magnets 31 are disposed between individual magnetic pole pieces 33b, 33b adjacent to each other in the circumferential direction ef. These plurality of first magnets 31 extend radially from the annular part 33a in the radial direction cd. The first magnet 31 is configured such that two side surfaces 31e intersecting the circumferential direction cd are magnetic pole faces 31n, 31s, and these magnetic pole faces 31n, 31s are in a state of being in contact with side surfaces 33be of magnetic pole pieces 33b.

Note that the first magnet 31 includes: an outer surface 31c opposed to the protruding part 33bf of the magnetic pole piece 33b in the radial direction cd; an inner surface 31a disposed at the annular part 33a side in the radial direction cd; and two side surfaces 31e opposed to the magnetic pole piece 33b in the circumferential direction ef. The magnetic pole faces 31n and 31s correspond to the two side surfaces 31e.

In addition, a second magnet 32 is disposed between the inner surface 33bd of each of the magnetic pole pieces 33b and the outer surface 33ad of the annular part 33a. The plurality of second magnets 32 are in a state of being disposed in each space formed between two adjacent connecting parts 33c of the plurality of connecting parts 33c in the circumferential direction ef.

The second magnet 32 includes an inner surface 32g disposed at the annular part 33a side, an outer surface 32h disposed at the magnetic pole piece 33b side, and two end parts 32i, 32i at both sides in the circumferential direction. In addition, the second magnet 32 is configured such that the inner surface 32g and the outer surface 32h intersecting the radial direction of the rotor 3 are magnetic pole faces 32n and 32s, and either one of these magnetic pole faces 32n and 32s serves as the outer surface 32h and is in a state of being in contact with an end part (inner surface 33bd) of the magnetic pole piece 33b at the annular part 33a side.

Figure 4:
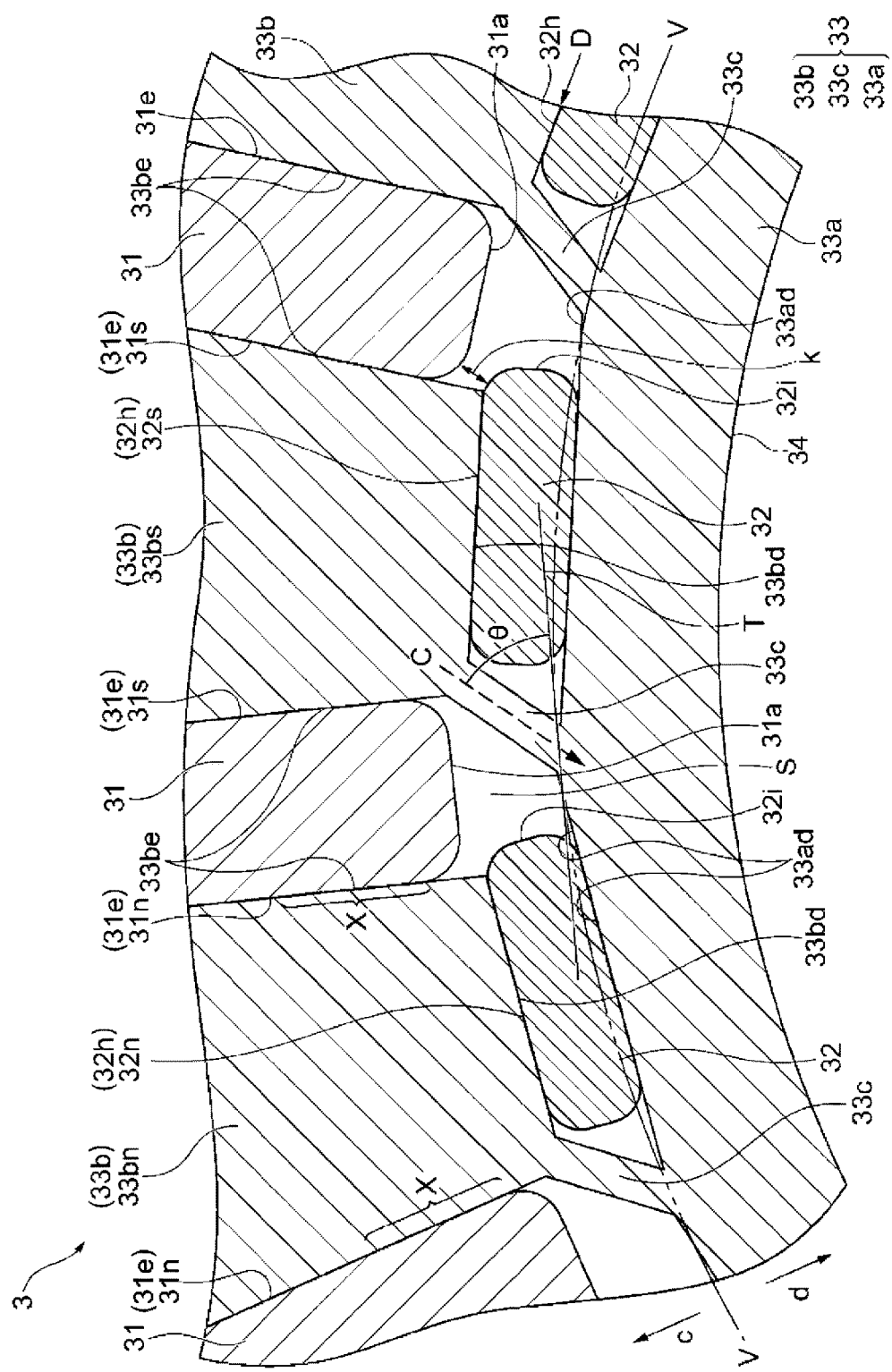
FIG. 4 is a partially enlarged cross-sectional view illustrating a connecting part of a rotor according to an embodiment serving as one example of the present invention and surroundings of the connecting part.

Description will be made focusing on two magnetic pole pieces 33bn and 33bs of the plurality of magnetic pole pieces 33b in FIG. 3. FIG. 4 illustrates a partially enlarged cross-sectional view of the connecting part 33c in FIG. 3 and the surrounding of the connecting part 33c.

In the circumferential direction, of two side surfaces 33be and 33be included in one magnetic pole piece (33bn or 33bs, the magnetic pole of the first magnet 31 at one side surface side), the magnetic pole of the first magnet 31 at another side surface side, and the magnetic pole of the second magnet 32 at the inner surface 33bd side of the magnetic pole piece (33bn or 33bs) in the radial direction have the same magnetic pole.

Specifically, at the magnetic pole piece 33bn, two magnetic pole faces 31n and 31n of the first magnet 31 in contact with the two side surfaces 33be and 33be in the circumferential direction ef, and the magnetic pole face 32n of the second magnet 32 in contact with the inner surface 33bd in the radial direction cd all have the N-pole.

On the other hand, at the magnetic pole piece 33bs, two magnetic pole faces 31s and 31s of the first magnet 31 in contact with the two side surfaces 33be and 33be in the circumferential direction ef, and the magnetic pole face 32s of the second magnet 32 in contact with the inner surface 33bd in the radial direction cd all have the S-pole.

In other words, at a certain one magnetic pole piece 33b, each of the magnets is disposed such that two magnetic pole faces 31n and 31n or 31s and 31s in contact with the first magnet 31 of two side surfaces 33be and 33be in the circumferential direction ef, and a magnetic pole face 32n or 32s in contact with the second magnet 32 all have the same magnetic pole.

Magnetic force of the N-pole or S-pole is applied to the magnetic pole piece 33b to form a piece of magnetic flux, and is released to the outside in the radial direction. The magnetic pole of the magnetic pole piece 33b is configured such that the N-pole and the S-pole are alternately repeated in the circumferential direction ef.

For example, at the magnetic pole piece 33bn, magnetic flux coming out of the two magnetic pole faces 31n of the first magnet 31 extending long in the radial direction cd of the rotor 3 forms a bundle, and is directed from the inner side d toward the outer side c in the radial direction cd. Then, the magnetic flux is released from an end part (outer surface 33bc) at the opposite side from the base point D side (annular part 33a side) of the magnetic pole piece 33bn, and acts on the stator 4.

At this time, the magnetic pole face 31n includes a region (for example, a region X in FIG. 3. Hereinafter, simply referred to as a "region X") spaced apart from the outer surface 33bc of the rotor 3 (close to the base point D or the inner surface 33bd). In this region, magnetic flux is less likely to be directed in a direction of the outer surface 33bc because the length of the region X to the outer surface 33bc is long.

However, in the present embodiment, the second magnet 32 including the magnetic pole face 32n having the same N-pole as the magnetic pole face 31n and facing the direction of the outer side c in the radial direction cd is disposed at an end part (inner surface 33bd) of the magnetic pole piece 33bn at the base point D side. This makes the magnetic flux from this magnetic pole face 32n as well as the magnetic flux from the region X effectively directed toward the direction of the outer surface 33bc. Thus, it is possible to effectively utilize magnetic flux generated from the first magnet 31 extending long in the radial direction cd of the rotor 3.

The magnetic flux generated from the first magnet 31 as well as the magnetic flux generated from the second magnet 32 are effectively directed toward the direction of the outer surface 33*bc*. This not only occurs in the magnetic pole piece 33*bn* but also similarly occurs in all the magnetic pole piece 33*b* including the magnetic pole piece 33*bs*.

As described above, with the present embodiment, the magnetic flux generated from the magnets (the magnet 31 and the magnet 32) can be effectively utilized, the amount of magnet used can be reduced, resulting in cost reduction, and weight reduction and size reduction of the motor 1. Studies made by the present inventors have confirmed that, even by reducing the amount of magnet used (based on the weight) by 20%, there is no difference in the performance of the motor 1, as compared with the conventional configuration (hereinafter, simply referred to as a "conventional configuration") without any second magnet provided.

As compared with the conventional configuration, in the present embodiment, the length of the magnetic pole piece 33*b* in the radial direction cd is short, and the length of the first magnet 31 in the radial direction cd is also short. Even if the amount of the second magnet 32 is considered in calculation, the amount of magnet used (based on the weight) is reduced by approximately 20%. Nevertheless, the density of magnetic flux discharged from the outer circumferential side of the magnetic pole piece 33*b* is equivalent between the case of the conventional configuration and the case of the present embodiment.

Alternatively, with the present embodiment, it is possible to provide a motor having high efficiency and high performance, without reducing or significantly reducing the amount of magnet used, as compared with the conventional configuration.

As illustrated in FIG. 4, at an end part (inner surface 33*bd*) of the magnetic pole piece 33*b* at the annular part 33*a* side (inner side d), the connecting part 33*c* is connected to an end part (specifically, an end part at the upstream side in a clockwise direction e) at one side in the circumferential direction ef. In addition, the end part of the connecting part 33*c* at the side opposite from the side connected to the magnetic pole piece 33*b* is connected to the outer surface 33*ad* of the annular part 33*a*.

The connecting part 33*c* extends in a direction (in other words, so-called "inclined direction") having both of the component of the radial direction cd and the component of the circumferential direction ef. In terms of a vector component directed from the side connected to the magnetic pole piece 33*b* toward the side connected to the annular part 33*a*, a direction of extension of the connecting part 33*c* matches a direction of a vector of the arrow C (FIG. 4) serving as a combination of a vector component of a counterclockwise direction f and a vector component of an inner side d direction.

In the present embodiment, a ratio (cd/ef) of the component (cd) of the radial direction cd in the direction of extension of the connecting part 33*c* relative to the component (ef) of the circumferential direction ef is $\sqrt{3}$ (that is, cd/ef=$\sqrt{3}$/1). This means that the angle $\theta$ formed by the direction (equal to the direction of the arrow C) of extension of the connecting part 33*c* with the tangential line T of the annular part 33*a* at the connecting point between the connecting part 33*c* and the annular part 33*a* is 60°. It is only necessary to select this formed angle $\theta$ from a range of approximately from 45° to 75°, and it is preferable to make selection from a range of approximately from 55° to 70°.

Note that the "component of the circumferential direction ef" is a component forming an arc in a strict sense. However, at the time of considering the "component (ef) of the circumferential direction ef" described above, the component (ef) represents a straight line (tangential line T) of a tangential line to the outer circumference of the annular part 33*a* at the connecting point of the connecting part 33*c* and the annular part 33*a*. At this time, although the outer surface 33*ad* of the annular part 33*a* does not necessarily form a circle, an imaginary circle V passing through all the connecting points of the connecting part 33*c* and the annular part 33*a* is the outer circumference of the annular part 33*a*.

By causing the connecting part 33*c* to extend long in an inclined direction in this manner, it is possible to extend the length of the connecting part 33*c* serving as a magnetic path to increase the magnetic resistance to the leakage flux in the arrow C direction. In addition, each magnetic pole piece 33*b* and a corresponding annular part 33*a* are connected only with one narrow line of the connecting part 33*c* (precisely "one thin sheet of" because the connecting part 33*c* has a plate shape with consideration of the existence in the back direction in FIGS. 2 to 4). Thus, the magnetic path is narrow, as compared, for example, with when connection is made by two or more (similarly, "two or more sheets of") connecting parts or a wide (similarly, "thick") connecting part, thereby reducing leakage of magnetic flux from the magnetic pole piece 33*b* to the annular part 33*a*.

At the time of driving the motor 1 to rotate the rotor 3, centrifugal force toward the outer side c in the radial direction acts on the rotor 3. In the motor 1 according to the present embodiment, the second magnet 32 exists between each magnetic pole piece 33*b* and a corresponding annular part 33*a*, and hence, the flexural rigidity of the rotor 3 increases.

In the motor 1 according to the present embodiment, a portion of one end part (specifically, an end part at the downstream side in the clockwise direction e) of the second magnet 32 in the circumferential direction ef is opposed to an end part (inner surface 31*a*) of the first magnet 31 at the inner surface side d in the radial direction cd, as indicated by the arrow k in FIG. 4. The second magnet 32 is disposed such that one end part in the circumferential direction ef is opposed to the inner surface 31*a* of the first magnet 31, as indicated by the arrow k. This makes it possible to broadly surround the inner surface 33*bd* side of the magnetic pole piece 33*b* with the second magnet 32. Thus, magnetic force with the second magnet 32 effectively acts on the magnetic pole piece 33*b*.

A space S exists between the one end part (that is, an end part at the downstream side in the clockwise direction e) of the second magnet 32 and the end part (inner surface 31*a*) of the first magnet 31 at the inner surface side d. The space S serves as a portion of the space formed between two adjacent connecting parts 33*c*. Since the space S exists at this position, a so-called flux barrier between adjacent magnetic pole pieces 33*b* is formed, thereby suppressing a short circuit of magnetic flux within the rotor core 33.

In addition, at the time of driving the motor 1 to rotate the rotor 3, inertial force toward the circumferential direction ef acts on the second magnet 32. In the motor 1 according to the present embodiment, the connecting part 33*c* is opposed to another end part (specifically, an end part at the upstream side in the clockwise direction e) of the second magnet 32 in the circumferential direction ef, thereby suppressing movement of the second magnet 32. In particular, by designing the motor 1 so as to cause the rotor 3 to rotate only or mainly in the clockwise direction e, it is possible to prevent, by the connecting part 33c, the second magnet 32 from moving. This makes it possible to stably dispose the second magnet 32.

As described above, the motor 1 using the rotor 3 according to the embodiment can be used as a drive device of a moving body such as an electric vehicle, an electronic device used in a home such as a compressor of an air conditioning device (air conditioner), or a rotary drive device of various other electronic devices. In particular, the motor 1 can be preferably used in applications requiring high power, high torque, energy saving, space saving, and the like.

As described above, the rotor, the motor using the rotor, and the electronic device according to the present invention have been described with reference to the preferred embodiments. However, the rotor, the motor using the rotor, and the electronic device according to the present invention are not limited to the configurations according to the embodiment described above. For example, the ratio between the component of the radial direction cd and the component of the circumferential direction of in the direction of extension of the connecting part 33c in the embodiment described above (that is, the degree of inclination, the "formed angle θ" described above) is not limited to the ratio (formed angle θ=60°) in the embodiment described above.

In addition, the number of magnetic poles (magnetic pole piece 33b) of the rotor 3 and the number of slots (the number of teeth parts 43) of the stator 4 are also given merely as examples in the embodiment described above, and can be appropriately selected and designed in accordance with characteristics, performances, and the like of a target motor.

In addition, the rotor, the motor using the rotor, and the electronic device according to the present invention may be appropriately modified by a person skilled in the art according to known knowledge in the past. Such modifications are of course included in the scope of the present invention as long as these modifications still include the configuration of the present invention.

REFERENCE SIGNS LIST

1 Motor
2 Shaft
2a, 2b End part
3 Rotor
31 First magnet
31a Inner surface
31c Outer surface
31e Side surface
31n, 31s Magnetic pole face
32 Second magnet
32n, 32s Magnetic pole face
32a, 32b Both side parts
32c, 32d, 32e, 32f Corner part
32g Inner surface
32h Outer surface
32i End part
32j Gap
33 Rotor core
33a Annular part
33ad Outer surface
33ae Inner surface
33b Magnetic pole piece
33bc Outer surface
33bd Inner surface
33be Side surface
33bf Protruding part
33c Connecting part
34 Hole part
35 First void
36a, 36b Second void
4 Stator
41 Stator core
42 Coil
43 Teeth part
44 Circular ring part
45 Insulator
5 Housing
51 Housing body
51a Bottom part
51aa Bearing housing (protruding part)
51b Tube part
51c Outer circumferential part
52 Cover
52a Flat part
52aa Bearing housing (protruding part)
52c Outer circumferential part
D Base point
S Space
X Region

The invention claimed is:

1. A rotor comprising:
a rotor core including:
an annular part;
a plurality of magnetic pole pieces extending in a radial direction; and
a plurality of connecting parts configured to connect the annular part and each of the plurality of magnetic pole pieces;
a plurality of first magnets disposed between two adjacent magnetic pole pieces, in a circumferential direction, of the plurality of magnetic pole pieces; and
a plurality of second magnets disposed in a space formed between two adjacent connecting parts, in the circumferential direction, of the plurality of connecting parts, wherein
the connecting part extends in a direction having both components of a component of the radial direction and a component of the circumferential direction, and
a portion of the space is surrounded by one end part of the second magnet, an end part at an inner surface side of the first magnet, the connecting part, and the annular part.

2. The rotor according to claim 1, wherein
the first magnet is in contact with a side surface of two adjacent magnetic pole pieces in the circumferential direction, and
the second magnet is in contact with an inner surface of the magnetic pole pieces in the radial direction.

3. The rotor according to claim 1, wherein
a magnetic pole of the first magnet at one side surface side and a magnetic pole of the first magnet at another side surface side, the magnetic pole pieces including the one side surface and the another side surface in the circumferential direction, and
a magnetic pole of the second magnet at an inner surface side of the magnetic pole pieces in the radial direction have a same magnetic pole.

4. The rotor according to claim 1, wherein
a portion of the one end part of the second magnet in the circumferential direction opposes the end part, at an inner surface side, of the first magnet in the radial direction.

5. A motor comprising:
the rotor according to claim 1;
a shaft fixed to the rotor; and
a stator including a coil and a magnetic body wound around with the coil.

6. An electronic device comprising the motor according to claim 5.

* * * * *